(12) United States Patent
Kuragaki et al.

(10) Patent No.: US 6,622,078 B1
(45) Date of Patent: Sep. 16, 2003

(54) VEHICLE RUNNING CONTROL DEVICE AND VEHICLE

(75) Inventors: Satoru Kuragaki, Hitachi (JP); Tokuji Yoshikawa, Hitachi (JP); Hiroshi Kuroda, Hitachi (JP); Toshimichi Minowa, Mito (JP); Kozo Nakamura, Hitachiota (JP); Kazuaki Takano, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/959,943

(22) PCT Filed: May 12, 1999

(86) PCT No.: PCT/JP99/02447

§ 371 (c)(1),
(2), (4) Date: Nov. 13, 2001

(87) PCT Pub. No.: WO00/69665

PCT Pub. Date: Nov. 23, 2000

(51) Int. Cl.$^7$ .................................................. G06F 7/00
(52) U.S. Cl. ........................................ 701/96; 180/179
(58) Field of Search ........................... 701/96, 93, 70, 701/76, 79; 180/169, 179

(56) References Cited

U.S. PATENT DOCUMENTS 6,233,515 B1 * 5/2001 Engelman et al. ............ 701/96

FOREIGN PATENT DOCUMENTS

| JP | 02061799 | 3/1990 |
| JP | 2241938 | 9/1990 |
| JP | 4113500 | 4/1992 |
| JP | 6091500 | 4/1994 |
| JP | 07137561 | 5/1995 |
| JP | 8036696 | 2/1996 |
| JP | 08169251 | 7/1996 |
| JP | 09207622 | 8/1997 |
| JP | 10338056 | 12/1998 |

* cited by examiner

Primary Examiner—William A. Cuchlinski, Jr.
Assistant Examiner—Edward Pipala
(74) Attorney, Agent, or Firm—Crowell & Moring LLP (57) ABSTRACT

A vehicle control device smoothly and constantly stops a controlled vehicle at the same vehicle-to-vehicle distance each time a preceding vehicle stops. The vehicle control device includes a unit that detects the speed of the preceding vehicle, and a unit that detects the distance between the preceding vehicle and the controlled vehicle. A first target distance setting unit is set when the preceding vehicle is running at a speed level higher than a preset speed; and a second target distance setting unit is set when it is running at a speed lower than the preset speed, and either a first target vehicle-to-vehicle distance or a second target vehicle-to-vehicle distance is selected.

15 Claims, 11 Drawing Sheets

VEHICLE RUNNING CONTROL DEVICE AND VEHICLE

TECHNICAL FIELD

The present invention relates to a vehicle having a running control device for regulating automatically vehicle-to-vehicle distance by controlling the vehicle's engine, transmission, brakes, motor, generator or otherwise.

BACKGROUND TECHNIQUE

A vehicle-to-vehicle distance control device used to follow automatically a preceding vehicle, is disclosed in Japanese patent prepublication No. 137561/1995. The disclosed vehicle-to-vehicle distance control device determines the distance between a preceding vehicle and an "own vehicle" (that is, the controlled vehicle having the control device), and adjusts the vehicle-to-vehicle distance by controlling a vehicle throttle when the latter is smaller than a first preset vehicle-to-vehicle distance. Further, when the vehicle-to-vehicle distance is larger than a second preset vehicle-to-vehicle distance, the vehicle-to-vehicle distance is adjusted by controlling the throttle. When the vehicle-to-vehicle distance is between the first vehicle-to-vehicle distance and the second vehicle-to-vehicle distance, an adjustable speed control is carried out based on the amount of variation in the vehicle-to-vehicle distance. The stronger brake fluid pressure is at the time when the vehicle-to-vehicle distance is smaller than the first vehicle-to-vehicle distance, the shorter the vehicle-to-vehicle distance becomes, and the longer, the weaker. At the time of the second vehicle-to-vehicle distance it is set to zero. Also, setting is made so that the larger throttle opening when the vehicle-to-vehicle distance is longer than the first vehicle-to-vehicle distance is, the longer the vehicle-to-vehicle distance becomes.

DISCLOSURE OF THE INVENTION

In a corresponding way, the vehicle-to-vehicle distance which a driver provides differs when the preceding vehicle is stopping and when it is running. A vehicle-to-vehicle distance control device which automates starting and stopping should control the vehicle in such a manner as to provide a vehicle-to-vehicle distance that gives a vehicle occupant a feeling of safety when the preceding vehicle is stopping, and when it is running. In the prior art, braking force is determined on the basis of the vehicle-to-vehicle distance and the speed of an own vehicle, within the limit below the first vehicle-to-vehicle distance; therefore, although the safety of an occupant is ensured, the vehicle-to-vehicle distance at the time of stopping is uncertain and it is not possible to give an occupant a sufficient feeling of safety. In order to give the occupant the feeling of safety, it is necessary to cause his vehicle to stop smoothly, with an appropriate vehicle-to-vehicle distance every time the preceding vehicle stops.

An object of this invention is to provide a running control device which gives an occupant the feeling safety, and causes a vehicle to stop with an appropriate vehicle-to-vehicle distance.

BEST MODE OF THE EMBODIMENTS FOR THE INVENTION

Figure 1:
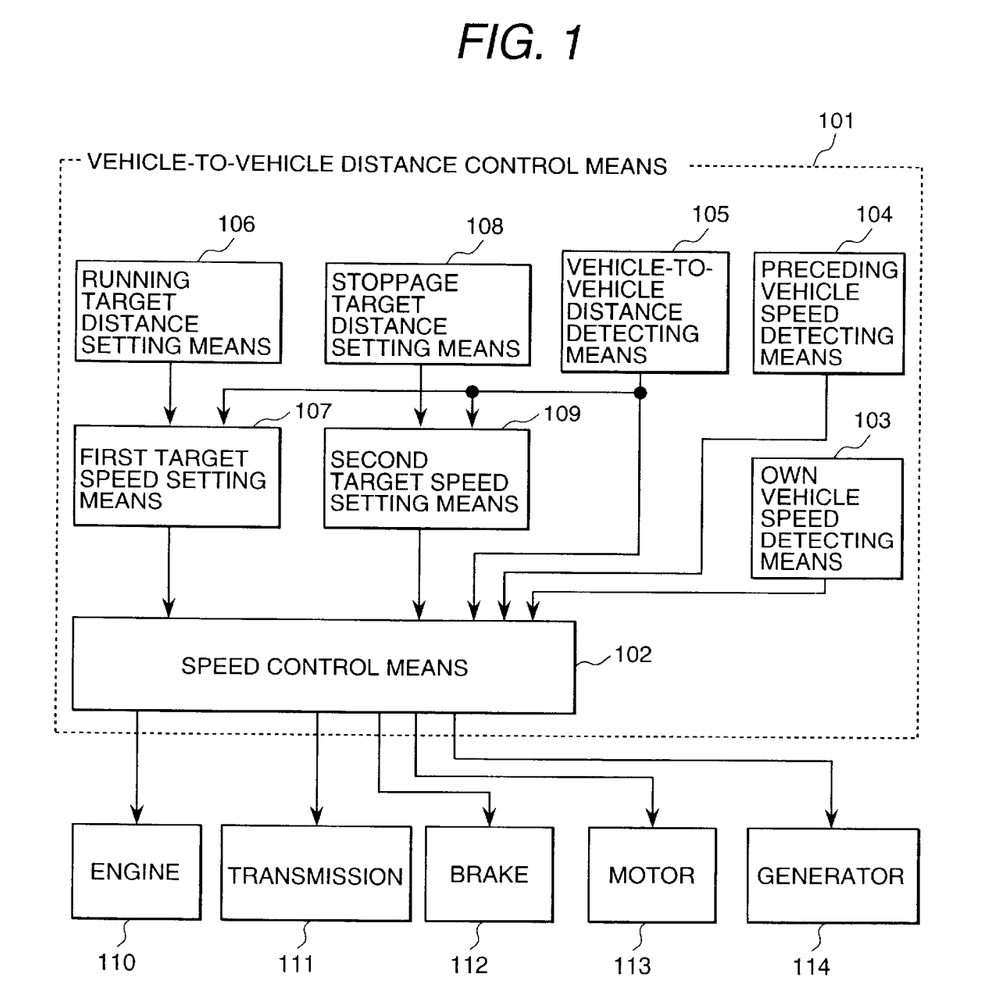
FIG. 1 is a block diagram that illustrates the principle of the invention.

FIG. 1 shows the principle of this invention. Vehicle-to-vehicle distance control means 101 comprises: speed control means 102; own vehicle speed detecting means 103; preceding vehicle speed detecting means 104; vehicle-to-vehicle distance detecting means 105 for detecting the distance between the preceding vehicle and the own vehicle; means 106 for setting a first target vehicle-to-vehicle distance which is set when the preceding vehicle is running; means 107 for setting a first target speed on the basis of information from the running target distance setting means 106 and the vehicle-to-vehicle distance detecting means 105; means 108 for setting a second target vehicle-to-vehicle distance which is set when the preceding vehicle is stopping (a distance within which a vehicle cannot enter, with a resolution greater than the resolution of the vehicle-to-vehicle distance detecting means such as a radar, for example, the extent of 0.5 m–5 m); means 109 for setting a second target speed on the basis of information from the stopping target distance setting means 108 and the vehicle-to-vehicle distance detecting means 105; speed control means 102 for controlling an engine 110, a transmission 111, a brake 112, a motor 113 or a generator on the basis of information from the preceding vehicle speed detecting means 104, the own vehicle speed detecting means 103, the vehicle-to-vehicle distance detecting means 105, the first target speed setting means 107 and the second target speed setting means 109. In the speed control means 102, when the speed of the preceding vehicle is greater than a predetermined speed (a speed which is between 0–18 km/h, for example 1 km/h), the setting value of the first target speed setting means 107 calculated from the running target vehicle-to-vehicle distance is used as the target speed. On the other hand, when the preceding vehicle speed is less than the predetermined speed, the setting value of the second target speed setting means 109 calculated from the stoppage target vehicle-to-vehicle distance is used.

Figure 2:
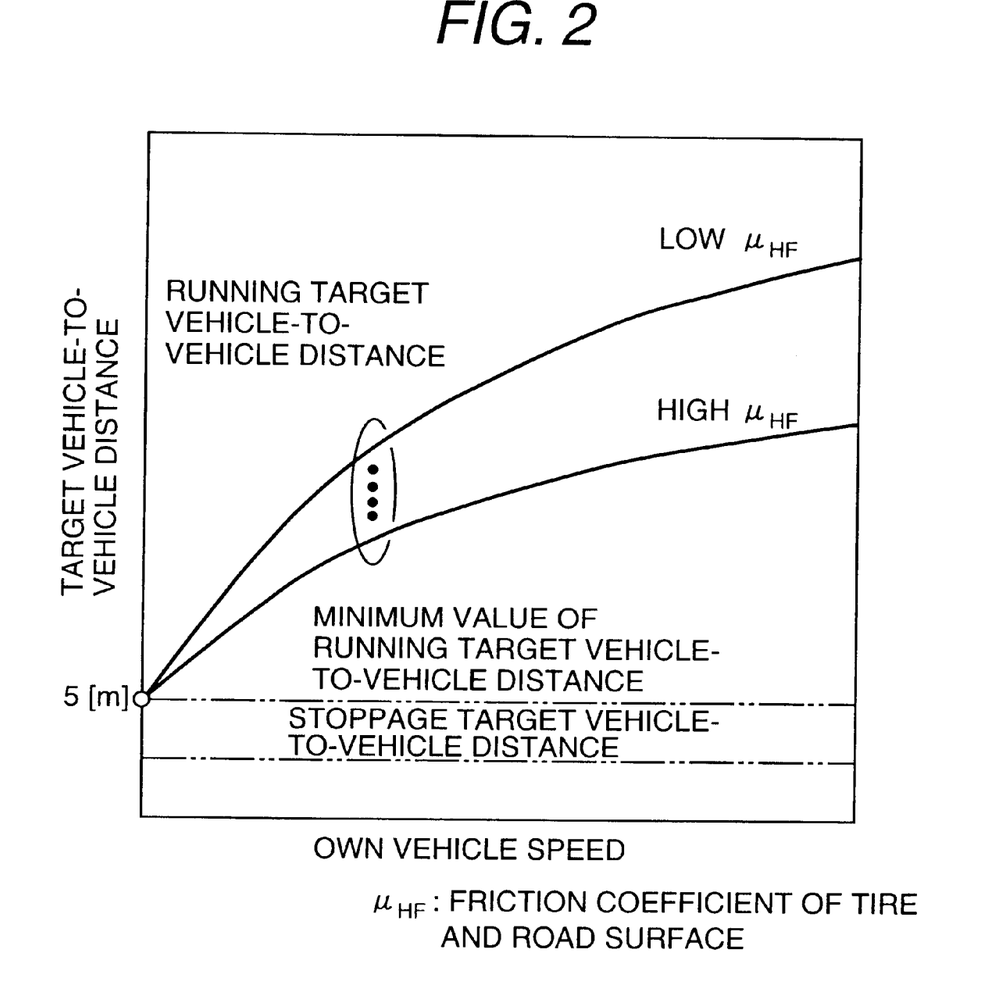
FIG. 2 shows a target vehicle-to-vehicle distance.

FIG. 2 is a graph that shows the relationship between the running target vehicle-to-vehicle distance, the stoppage target vehicle-to-vehicle distance and the own vehicle speed. From the minimum value (for example, 5 m) of the running target vehicle-to-vehicle distance, the running target vehicle-to-vehicle distance is set in response to the own vehicle speed and the friction coefficient $\mu_{HF}$ of a road surface and a tire. Also, in case where it is impossible to measure or assume the friction coefficient $\mu_{HF}$ of the road surface and the tire, the running target vehicle-to-vehicle distance may be set so that when a wiper switch is OFF high $\mu^{HF}$ is provided and when the wiper switch is ON low $\mu_{HF}$ is provided. When the speed of the proceeding vehicle falls below the predetermined speed, the stopping target vehicle-to-vehicle distance is brought about regardless of the own vehicle speed. The setting value of the stopping vehicle-to-vehicle distance can be set by the driver, within a range that is less than the minimum value of the running target vehicle-to-vehicle distance.

Figure 3:
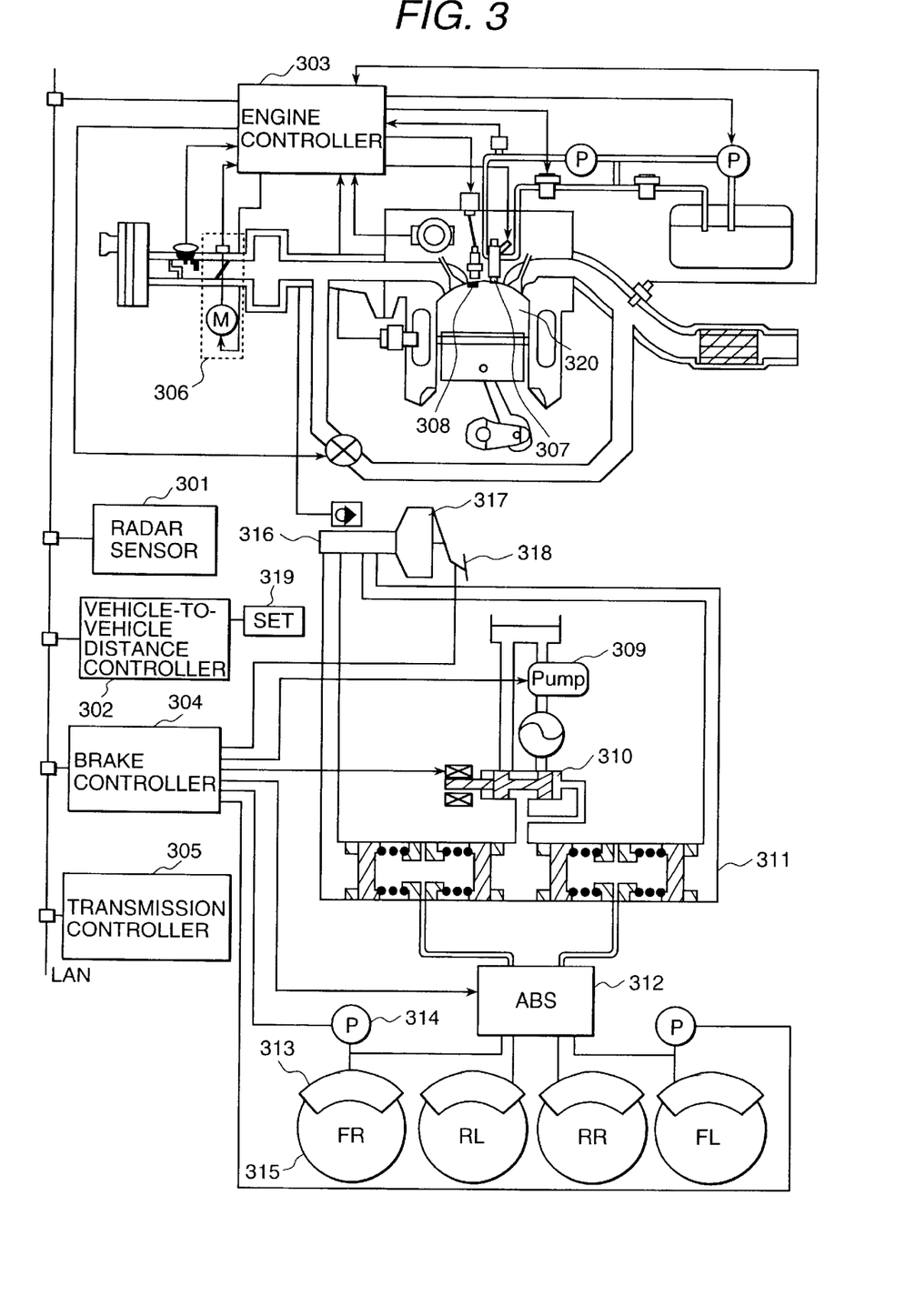
FIG. 3 is a block diagram of a system embodying the invention.

FIG. 3 is a first system configuration to which this invention is applied. A radar sensor 301 detects the distance between the proceeding vehicle and the own vehicle, and the relative speed. A transmission controller 305 controls an automatic transmission. Vehicle speed is transmitted to a vehicle-to-vehicle distance controller 302. The vehicle-to-vehicle distance controller 302 calculates the target speed from the vehicle-to-vehicle distance, the relative speed, the own vehicle speed and the target vehicle-to-vehicle distance, and further calculates target torque from its target speed and the own vehicle speed. The target torque is transmitted to an engine controller 303 and a brake controller 304. Also, if it is necessary to change the gear ratio, a gear change command is sent to transmission controller 305. In the engine controller 303, when the target engine torque is positive, the opening angle of an electronic control throttle 306, the amount of fuel injected from a fuel injection valve 307 and the ignition timing of a ignition plug 308 are properly adjusted to control engine timing. Further, in the brake controller 304, when the target torque is negative, an oil pressure pump 309 and a proportional solenoid valve 310 are adjusted to the brake torque of a wheel. A valve 311 relays to a braking mechanism the larger of the automatic braking oil pressure adjusted by the proportional solenoid valve, and the foot braking oil pressure adjusted by the driver through a master cylinder 316. A braking oil pressure sensor 114 detects the braking oil pressure applied to the braking mechanism 313. The braking controller feedback-controls the proportional solenoid valve 310 with reference to the value of the braking oil pressure sensor 314.

Figure 4:
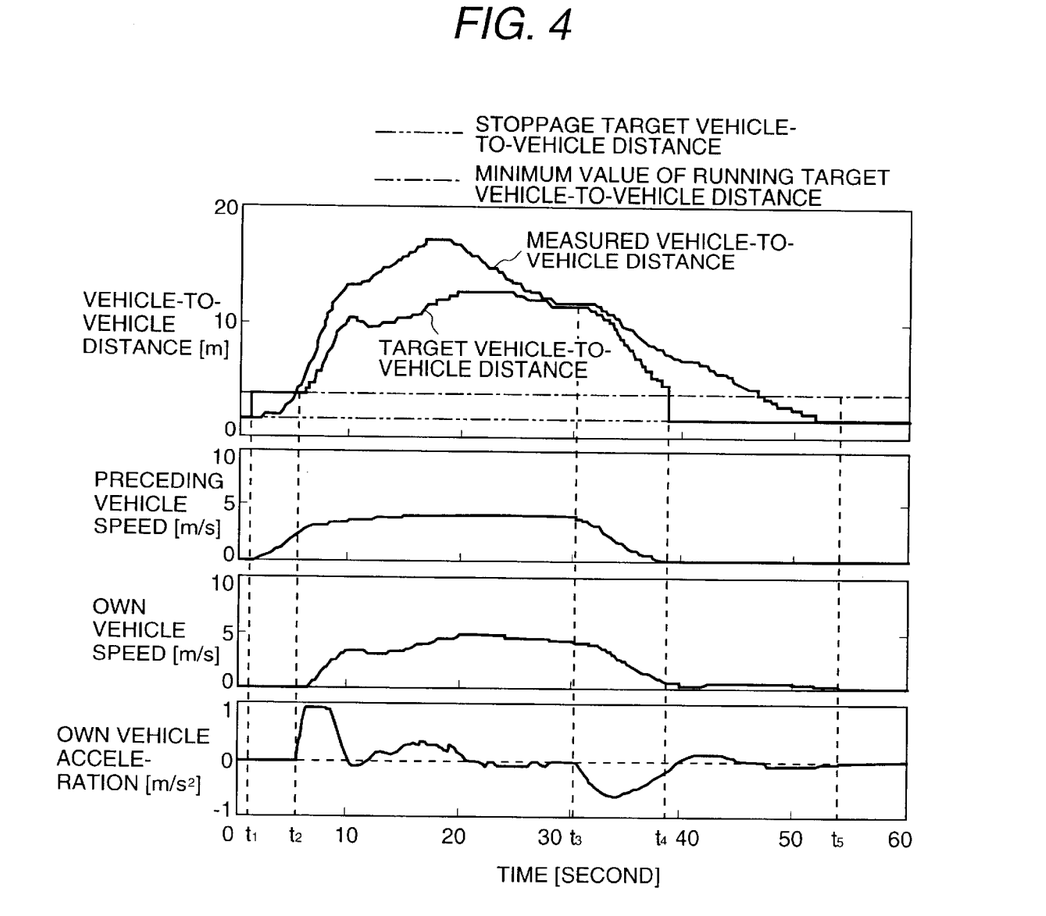
FIG. 4 is a graphic depiction that shows the switching between a running target vehicle-to-vehicle distance and a stopping target vehicle-to-vehicle distance.
Figure 5:
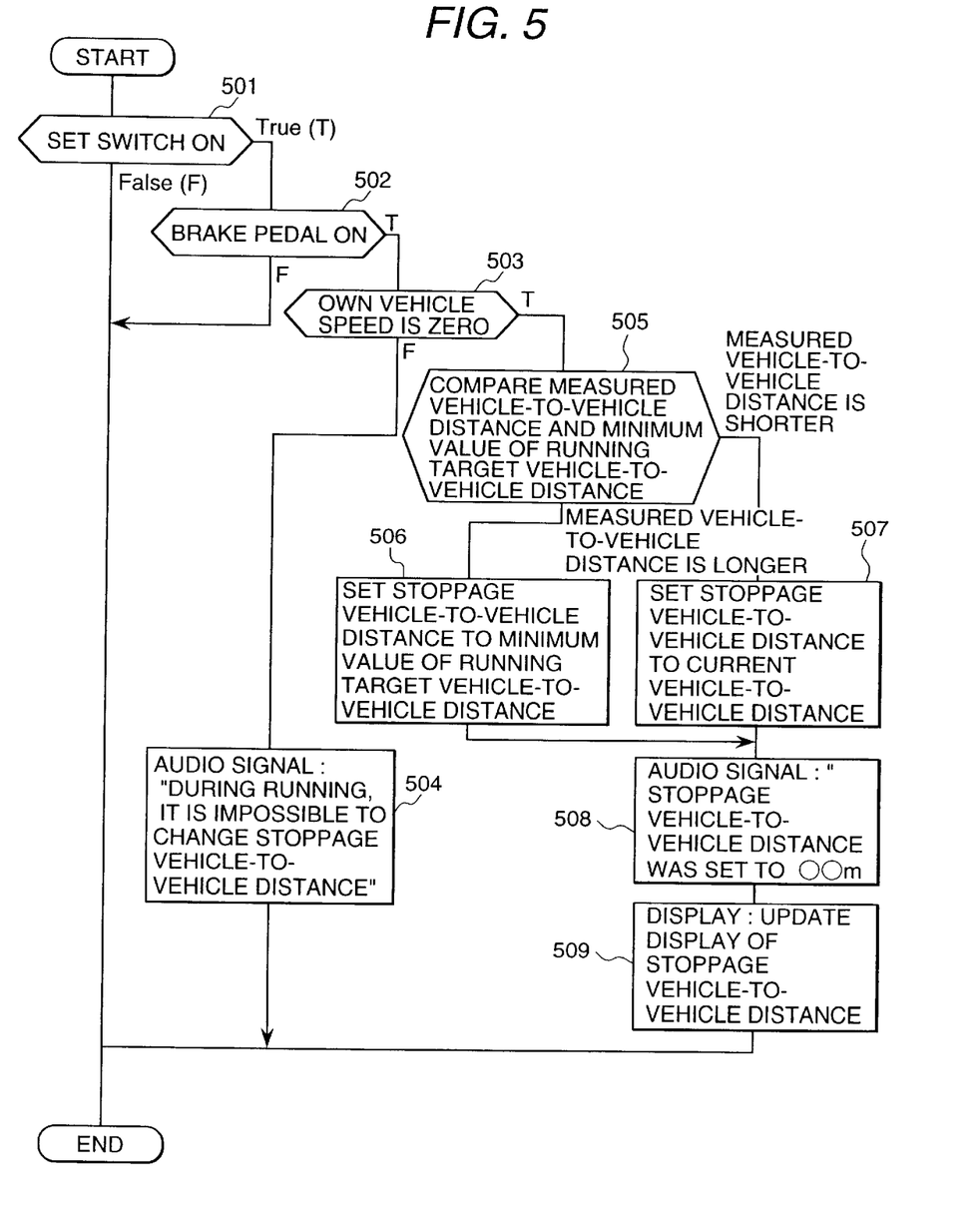
FIG. 5 is a flow diagram that shows the setting of the stopping target vehicle-to-vehicle distance.

FIG. 4 is an example in which starting and stopping are carried out by applying this invention. Vehicle-to-vehicle distance, the preceding vehicle speed, the own vehicle speed and the own vehicle acceleration are shown, and the horizontal axis represents time. The target vehicle-to-vehicle distance is set to the stopping vehicle-to-vehicle distance when the preceding vehicle is stopping, and to the running target vehicle-to-vehicle distance when it is running. First, the stopping vehicle-to-vehicle distance is set by the driver by means of a switch. At the time 0, the driver turns the switch on for controlling the vehicle-to-vehicle distance (SET switch 319) while he or she operates the brake pedal 318 in a traffic backup, so that the stopping target vehicle-to-vehicle distance is set. Processes at the time the setting are shown in FIG. 5. In Step 501, it is judged whether the SET switch 319 (FIG. 3) is being ON. If so, in next Step 502, it is judged whether the braking pedal 318 (FIG. 3) is working (ON state). If so, in Step 503, it is judged whether the own vehicle is stopping. When the own vehicle is running, in Step 504 an announcement that the vehicle-to-vehicle distance control is not carried out and an announcement that the stopping vehicle-to-vehicle distance cannot be set are made to the driver using an audio signal. The announcements may be made by a lump and/or character representation in addition to the audio. When the own vehicle is stopping, in Step 505 it is judged whether the measured vehicle-to-vehicle distance is shorter than the minimum value of the running vehicle-to-vehicle distance. If not, in Step 506 the stopping target vehicle-to-vehicle distance is set to the minimum value of the running vehicle-to-vehicle distance. If it is shorter, in step 507 the stopping target vehicle-to-vehicle distance is set to the measured vehicle-to-vehicle distance. Next in Step 508, an announcement is made to the driver that the setting of the stopping vehicle-to-vehicle distance was carried out. In Step 509, the stopping vehicle-to-vehicle distance which was set is newly displayed. When the driver stops handling of the SET switch and the braking pedal, the own vehicle starts the vehicle-to-vehicle distance control.

Table 1 shows an example of the setting of the stopping target vehicle-to-vehicle distance via the processes in FIG. 5.

TABLE 1

| | Preceding Vehicle Speed | Own Vehicle Speed | Measured Vehicle-to-Vehicle Distance | Minimum Value of Running Target Vehicle-to-Vehicle Distance | Stoppage Vehicle-to-Vehicle Distance Which was Set |
|---|---|---|---|---|---|
| 1 | 0 m/s | 0 m/s | 0 m | 5 m | 3 m |
| 2 | 0 m/s | 0 m/s | 6 m | 5 m | 5 m |
| 3 | 2 m/s | 0 m/s | 3 m | 5 m | 3 m |
| 4 | 2 m/s | 0 m/s | 6 m | 5 m | 5 m |
| 5 | 0 m/s | 2 m/s | 3 m | 5 m | No Modification |
| 6 | 0 m/s | 2 m/s | 6 m | 5 m | No Modification |

The table shows six examples in connection with respect to the preceding vehicle speed, the own vehicle speed and the vehicle-to-vehicle distance. The minimum value of the running target vehicle-to-vehicle distance is set to 5 m. In Examples 1 through 4, since the own vehicle speed is zero (the own vehicle is stopped), the stopping target vehicle-to-vehicle distance is set to the measured vehicle-to-vehicle distance at the time when the driver handled the SET switch and operated the braking pedal, while the minimum value of the running target vehicle-to-vehicle distance is taken as the maximum value. In examples 5 and 6, since the own vehicle speed is 2 m/s (the own vehicle is running), the stopping target vehicle-to-vehicle distance is not changed. At that time, in case where the stopping target vehicle-to-vehicle distance is not being set (at the first time), the minimum value of the running target vehicle-to-vehicle distance is set. With the processes shown in FIG. 5, the driver can set the stopping target vehicle-to-vehicle distance certainly and visually.

Again, returning the explanation of FIG. 4, when the driver handles the SET switch and operates the braking pedal at time 0, since both of the preceding vehicle and own vehicle are stopping, the stopping target vehicle-to-vehicle distance is set to the measured vehicle-to-vehicle distance as shown in the processes in FIG. 5. At the point of time $t_1$, when the preceding vehicle takes off from the stopped condition, the target vehicle-to-vehicle distance is changed from the stopping target vehicle-to-vehicle distance to the minimum value of the running target vehicle-to-vehicle distance. When the preceding vehicle increases its speed, and at the point of time $t_2$ the vehicle-to-vehicle distance becomes longer than the target vehicle-to-vehicle distance, the own vehicle takes off from the stopped condition. The throttle opening command is always started at a constant period (the range from 10 ms to 100 ms), and is set by the processes shown in FIG. 6, FIG. 7 and FIG. 8.

Figure 6:
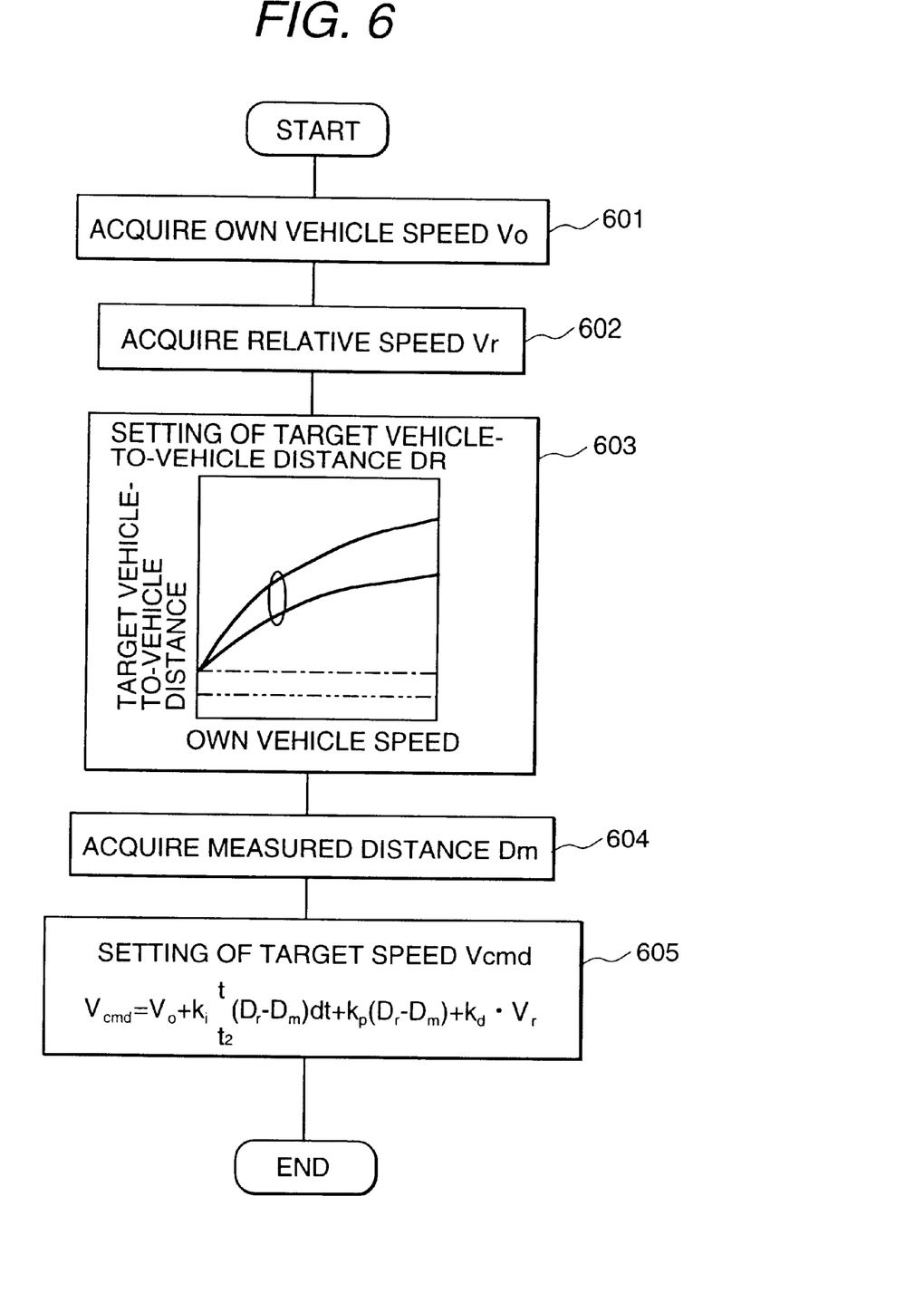
FIG. 6 is a flow diagram that shows the setting of a target speed.

FIG. 6 shows processes in the vehicle-to-vehicle distance controller 302 in FIG. 3. In Step 601, the own vehicle speed is acquired. In Step 602, the relative speed Vr is acquired. In Step 3, the target vehicle-to-vehicle distance Dr is set. The preceding vehicle speed can be measured as the sum of the own vehicle speed and the relative speed. When the preceding vehicle speed is less than zero, the target vehicle-to-vehicle distance Dr is set to the stopping vehicle-to-vehicle distance. When the preceding vehicle speed is greater than zero, the running target vehicle-to-vehicle distance is set in response to the own vehicle speed. In Step 604, the target Vcmd is set. The settings are effected using following Equation 1:

$$Vcmd = V_0 + k_i \int_{t2}^{t} (D_r - D_m)dt + k_p(D_r - D_m) + k_d - V_r \quad \text{[Equation 1]}$$

Here, Ki, Kp and Kd are control constants, which is set to predetermined values.

Figure 7:
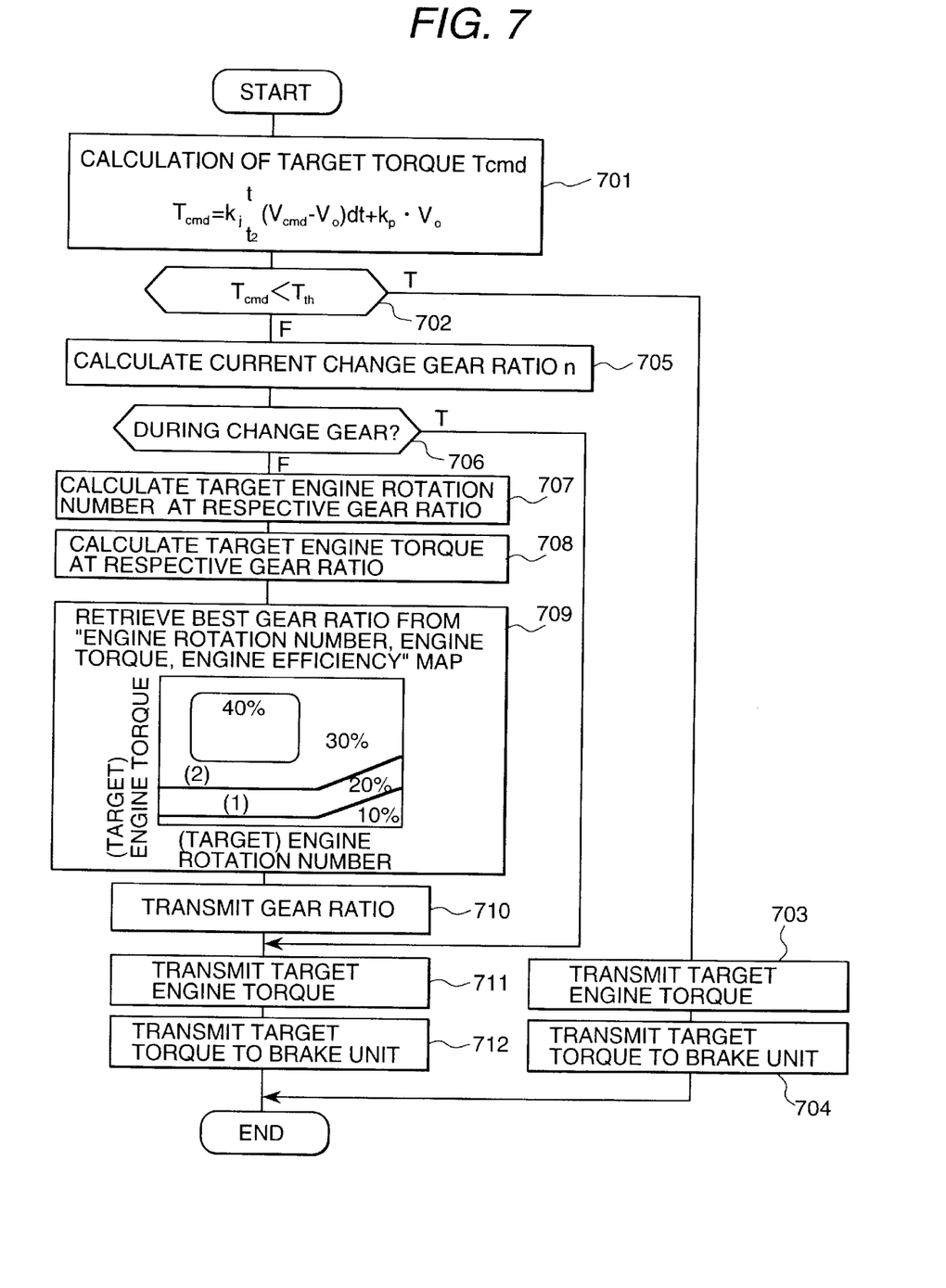
FIG. 7 is a flow diagram that shows the setting of a target engine torque and a gear ratio.

FIG. 7 shows processes performed by the vehicle-to-vehicle distance controller 302 following the processes in FIG. 6. In Step 701, the target torque Tcmd is calculated from the target speed Vcmd and the own vehicle speed Vo, using following Equation 2:

$$T_{cmd} = k_i \int_{t2}^{t} (V_{cmd} - V_0)dt + kq \cdot V_0 \quad \text{[Equation 2]}$$

Here, Kj and Kq are control constants which are set predetermined values.

In Step 702, a predetermined torque Tth and a target torque Tcmd are compared. If the target torque is larger than the predetermined torque, Steps 705 and beyond are carried out, while the if target torque is smaller, Steps 703 and beyond are carried out. In Step 705, a current change gear ratio is calculated on the basis of engine rotational speed and wheel rotational speed. In Step 706, the judgment of "during speed change" is made based on whether the calculated change gear ratio is the same as the predetermined change gear ration of a transmission installed in the vehicle. If not "during speed change", in Step 707, the target engine rotation number is calculated, using the gear ratio of the transmission installed in the vehicle, in the case of the use of the respective gears. In next Step 708, the target engine torque is calculated when the respective gears were used. Then, in Step 709, when the respective gear ratio is used, engine heat efficiency is retrieved from the map of the target engine rotation number, the target engine torque and the engine heat efficiency. Among them, the gear ratio, target engine rotational speed and target engine torque giving the best engine heat efficiency are selected. For example, in FIG. 7, since the engine heat efficiency is 20% in the first-speed gear ratio and 30% in the second-speed gear ratio, the second-speed is selected. In Step 710, the gear ratio and the target engine torque are transmitted to the transmission controller and the engine controller, respectively, as command values. In Step 706, "during speed change" judgment is made; the engine controller operates on the basis of the command of the transmission controller, and therefore the command from the vehicle-to-vehicle distance controller is not transmitted. In Step 711, a command to release automatic braking is transmitted to the brake controller.

Figure 8:
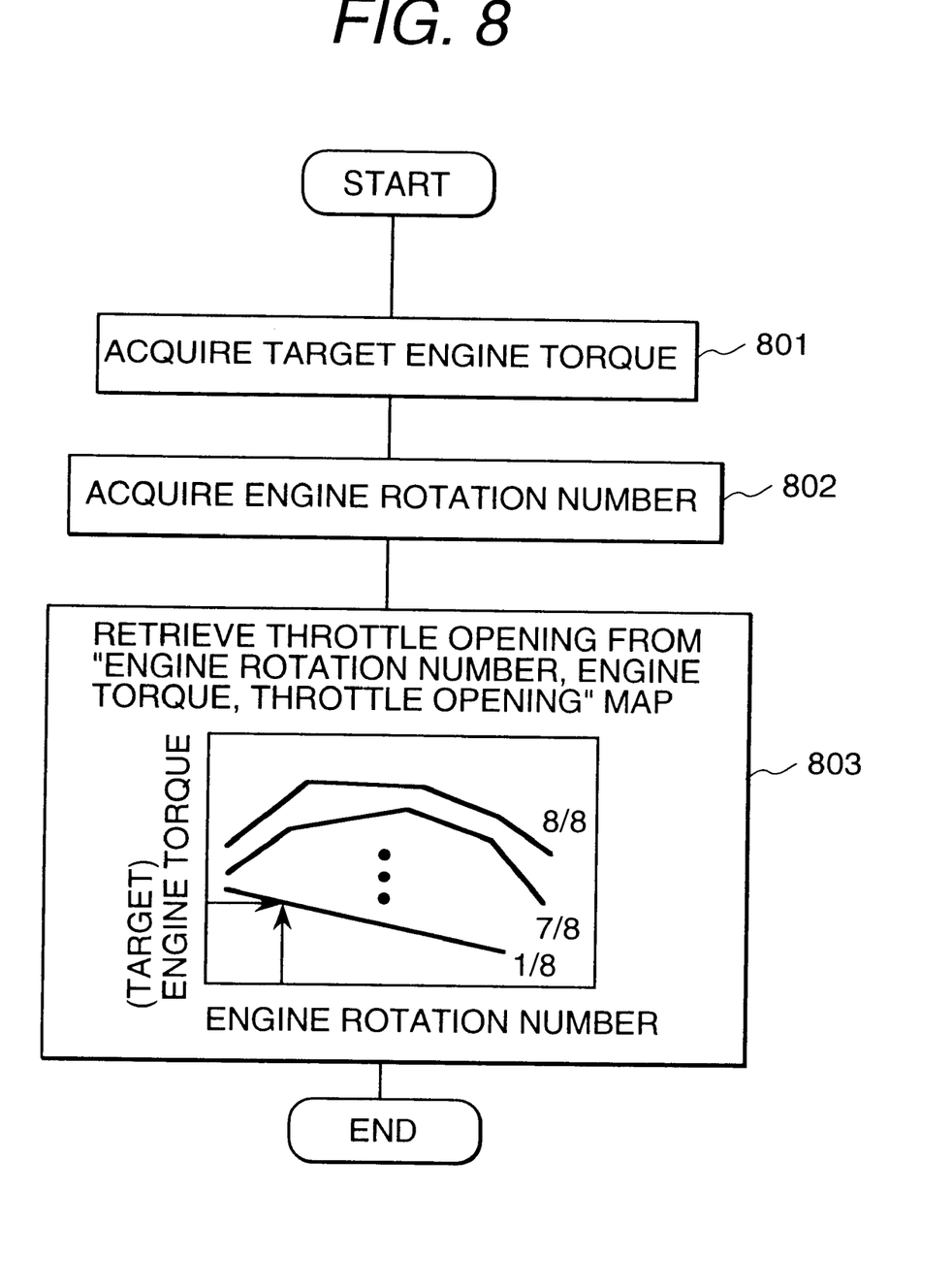
FIG. 8 is a flow diagram that shows the setting of a throttle opening instruction.

FIG. 8 shows the processes for transforming the target engine torque to the throttle opening command in the engine controller. In Steps 801 and 802, the target engine torque and the engine rotational speed are acquired. In Step 803, the throttle opening is retrieved from the map of the engine rotational speed, the engine torque and the throttle opening, and is set as to the throttle opening command value. Depending upon this throttle command value, the electronic control throttle 306 in FIG. 3 is controlled. Further, in line with the amount of air in the cylinder 320 (which varies in response to the throttle opening), the amount of fuel injection and the timing of ignition are controlled to effectuate the target engine torque.

Referring once more to FIG. 4, between the point of time $t_2$ and the point of time $t_3$, through the processes shown in FIGS. 6 to 8, by controlling the electronic control throttle 306 and changing the own vehicle acceleration gradually (except for the time of start), it is possible to run while maintaining a measured vehicle-to-vehicle distance which is longer than the target vehicle-to-vehicle distance. At the point in time $t_3$, the preceding vehicle started deceleration and at the point of time $t_4$, it stopped. At this time, the own vehicle carries out deceleration due to the automatic braking through the processes in FIG. 6, FIG. 7 and FIG. 9. Between the point of time $t_3$ and the point of time $t_4$, in Step 702 in FIG. 7, it is judged that the target torque Tcmd is smaller than the predetermined torque Tth. In Step 703, the target engine torque is transmitted to the engine controller as zero. In Step 704, the target torque is send to the braking controller.

Figure 9:
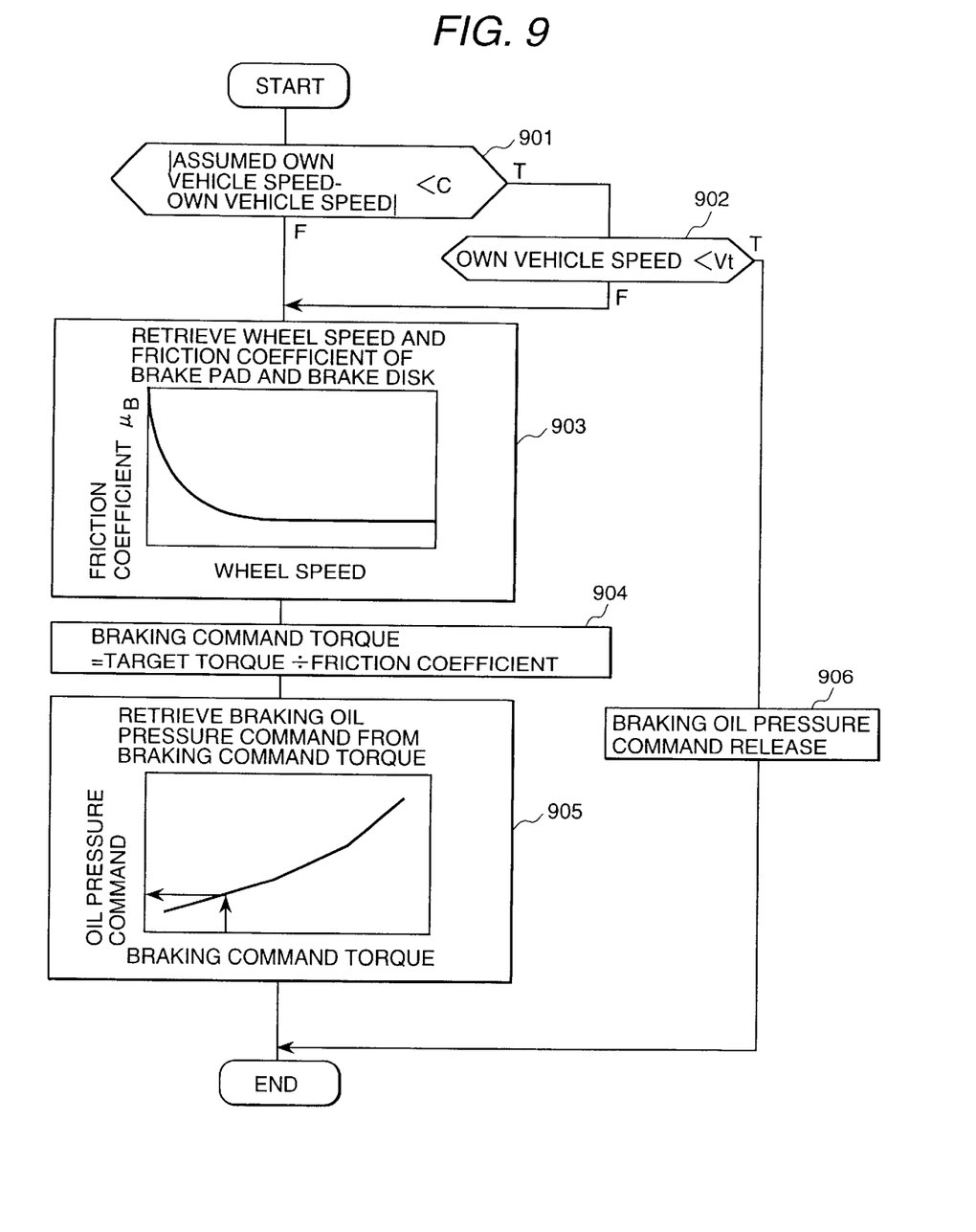
FIG. 9 is a flow diagram that shows the setting of a braking oil pressure instruction.

In the braking controller 304, the processes in FIG. 9 are performed out at a constant period. In Step 901, the own vehicle speed assumed from the time-series data of the vehicle speed is compared with the own vehicle speed, and if it is larger than a predetermined range C, the process in Step 902 is performed. When the difference between the assumed own vehicle speed and the own vehicle speed is large, there is the possibility that the wheel is locked. When it is small, the process in Step 903 is performed. In Step 902, the own vehicle speed is compared with a predetermined speed Vt, and if it is small, the process of Step 903 is performed. That is, although there is the possibility that the wheel is locked, since the own vehicle is substantially stopped, automatic braking control is continued.

In Step 903, a friction coefficient $\mu_B$ is retrieved from the relationship between the wheel speed of the own vehicle (which has been measured in advance) and the friction coefficient $\mu_B$ of a braking pad and a brake disk. In Step 904, torque for the braking command is calculated on the basis of the retrieved friction coefficient $\mu_B$ and the target torque Tcmd. In Step 905, brake fluid pressure command is retrieved and set on the basis of the relationship between preset torque for the braking command and braking oil pressure command. Then, on the basis of the braking oil pressure command, the proportional solenoid valve 310 in FIG. 3 is controlled and the oil pressure generated in the oil pressure pump 309 is applied to the braking mechanism through the valve 311. The oil pressure applied to the braking mechanism 313 is monitored by the braking oil pressure sensor 314, and the proportional solenoid valve 310 is feedback-controlled to agree with the braking oil pressure command.

In Step 902, in case where the own vehicle speed is larger than a predetermined speed Vt, the braking oil pressure command is set to zero to prevent locking of the wheel. Also, the valve 311 is coupled the brake master cylinder 314 which the driver handles, and in the case where the driver handles the brake, it is possible to decelerate the vehicle by applying the brake pressure to the braking mechanism 313 through the valve 311.

The processes in FIG. 6 through FIG. 9 calculate a first target speed on the basis of a first target vehicle-to-vehicle distance which is set at the time when the preceding vehicle is running, so as to control automatically the throttle or the brake. Therefore, since the own vehicle is also decelerated to maintain the first target distance when the preceding vehicle decelerates, it is possible to provide a control that gives the driver a feeling of safety.

Again, the explanation returns to FIG. 4. When the preceding vehicle stops at the point of time $t_4$, the target vehicle-to-vehicle distance is modified to the stopping target vehicle-to-vehicle distance (which was set at the time 0). Between the point of time $t_4$ and the point of time $t_5$ the own vehicle runs slowly and stops at the stopping target vehicle-to-vehicle distance. The speed of the own vehicle, since it has been controlled to maintain the running target vehicle-to-vehicle distance before the point of time $t_4$, is zero or low, as is the preceding vehicle speed. Therefore, in order to yield the stopping target vehicle-to-vehicle distance which is shorter than the running target vehicle-to-vehicle distance, it is the own vehicle must again increase its speed and go ahead. At that time, by limiting the ceiling value of speed and the range of acceleration, and varying smoothly the own vehicle acceleration, it is possible to give the driver a feeling of safety.

Figure 10:
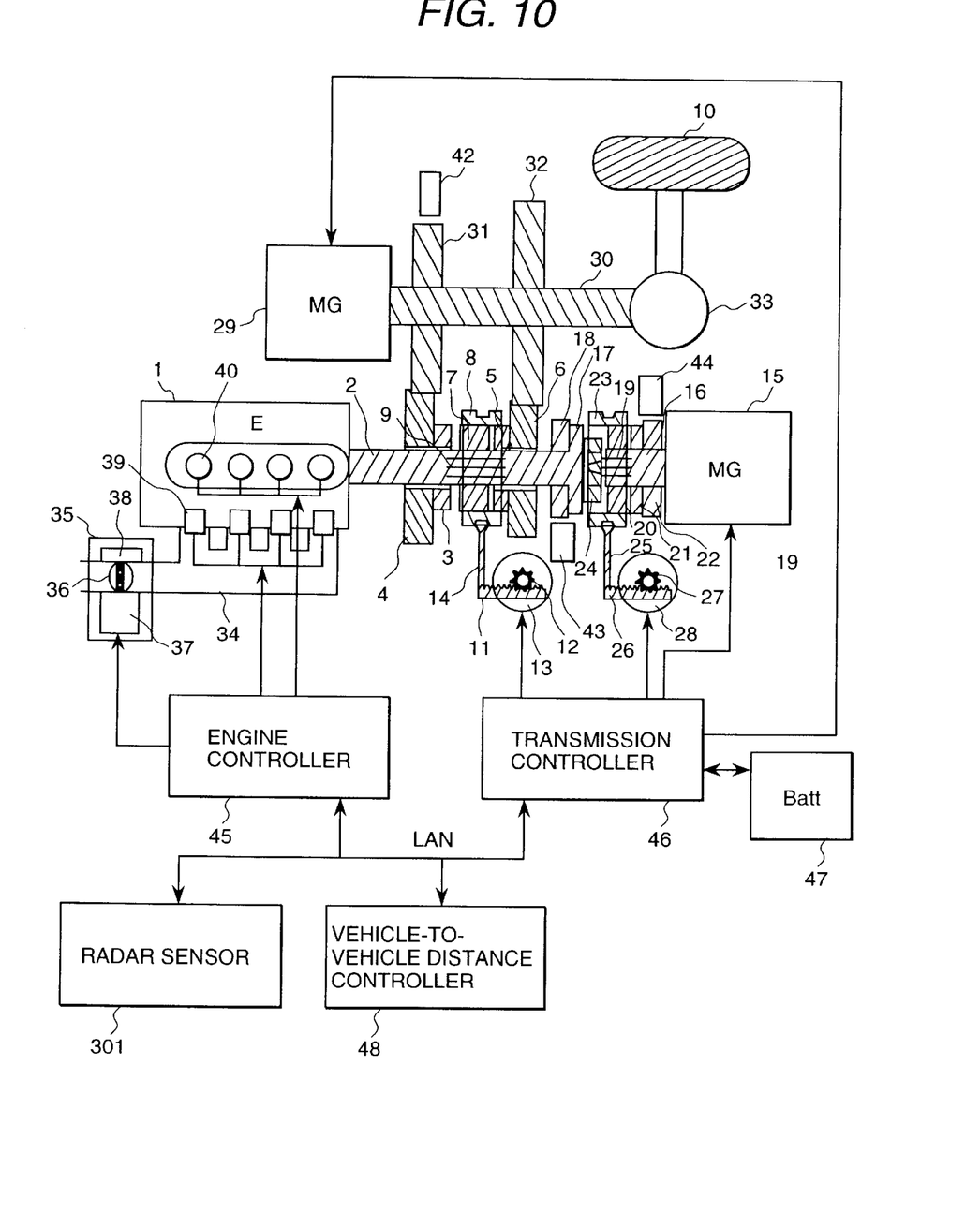
FIG. 10 shows a configuration of a hybrid vehicle.

FIG. 10 shows the configuration of a hybrid vehicle system according to a second embodiment of this invention. In the system shown in FIG. 10, the output shaft 2 of an engine 1 comprises a low speed engine-side gear 4 having a mating gear 3, a high speed engine-side gear 6 having a mating gear 5, and a hub 7 and sleeve 8 for coupling directly the low speed engine-side gear 4 and the high speed engine-side gear 6 to the output shaft 2. In order to transmit the torque of the engine 1 to the low speed engine-side gear 4 and the high speed engine-side gear 6, it is needed to move the sleeve 8 in the axial direction of the output shaft 2 to couple directly the mating gear 3 or 5 to the hub 7. The mating gears 3 and 5 and the hub 7 have the same grooves, and on the inside of the sleeve 8 a groove (not shown) is formed which engages with the hub 7. In order to move the sleeve 8, a linear actuator consisting of a rack 11, a small gear 12 engaging with the rack and a stepping motor 13 are used. The periphery of the sleeve 8 is free with respect to the rotational direction of the output shaft 2, and a lever 14 is installed which does not rotate with respect to the rotation of the sleeve 8. A clutch mechanism comprised of the hub 7, the sleeve 8, the mating gear 3 and the mating gear 5 is called as a dog clutch. This mechanism can transmit the energy of a power source such as the engine 1 to a tire 10 with high efficiency. Also, the stepping motor (1) 13 can recognize the rotational angle by preset step number, and therefore it is possible to judge the moving position of the rack 11. Accordingly, it is possible to judge, at present, whether the low speed engine-side gear 4 is being used, the high speed engine-side gear 6 is being used, or a neutral position is set. In place of the above-mentioned stepping motor, the above-mentioned judgment can be preformed by the combination of a sensor for detecting the position of the rack and a direct current motor.

The above-mentioned clutch mechanism and linear actuator are used also to couple directly the output shaft 2 of the engine 1 and a generator 15. A gear 18 for detecting the rotational speed Ne of the engine 1 is installed one the output shaft 2. The gear 18 rotates with the output shaft 2 and has a mating gear 17. Also, a gear 22 for detecting the rotational speed Ng of the generator 15 is installed on the output shaft 16. The gear 22 rotates with the output shaft 16 and has a hub 20 movable along a groove 19 in the axial direction of the output shaft 16 and a mating gear 21. A sleeve 23 is provided on the periphery of the hub 20. Further, between the output shaft 2 and the output shaft 16, a thrust bearing 24 is provided, which reduces frictional resistance due to the contact of the above-mentioned output shaft and prevents the center slippage of the shafts. A linear actuator portion comprises a lever 25, a rack 26, a small gear 27 and a stepping motor (2) 28. On the output shaft 30 of a motor-generator 29 for driving the vehicle (not shown), a low speed motor-side gear 31 and a high speed motor-side gear 32 are mounted which engage with the low speed engine-side gear 4 and the high speed engine-side gear 6, respectively. The low speed motor-side gear 31 is used to detect the rotational speed Nm of the motor-generator 29. Also, on the output shaft 30 a final deceleration gear 33 is mounted which enables the running only by the motor-generator 29.

In a vehicle-to-vehicle distance controller 48 in FIG. 10, the target motor torque of the motor-generator 29, and the step number of the stepping motor (1) 13 and the stepping motor (2) 28, are transmitted to a transmission controller 46 through a LAN. If the target motor torque is positive, the target motor torque is converted to target current in the transmission controller, and in order to bring the target current into line with current flowing through the stator of the motor-generator 29, the applied voltage of the stator and the period are controlled and the output torque of the motor-generator 29 is effectuated. If, however, the target motor torque is negative, the applied voltage of the stator is released. Since the vehicle cannot stop abruptly, a configuration in which the tire rotates the motor-generator 29 is provided. At that time, current proportional to torque for rotating the motor-generator 29 is generated in the coil of the stator. By using this current to charge a battery 47, braking torque for decreasing the speed of the vehicle is generated (that is, regenerative braking occurs). When charging of the battery 47 is stopped, the regenerative braking is released. Therefore, by controlling whether the battery 47 is charged, the braking torque changes to enable the control of the vehicle.

Figure 11:
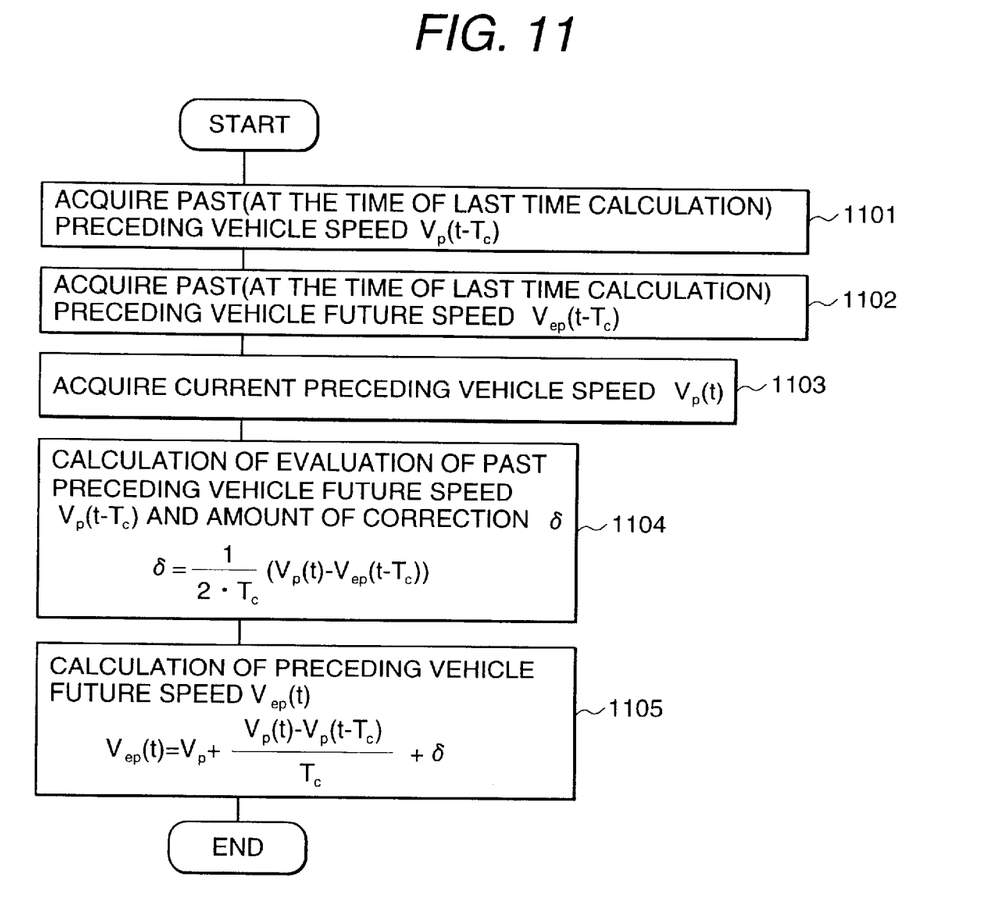
FIG. 11 is a flow diagram that shows an assumption of the future speed of a proceeding vehicle.

Furthermore, in FIG. 4, although the running target vehicle-to-vehicle distance and the stopping target vehicle-to-vehicle distance are switched on the basis of the speed of the preceding vehicle, the future speed of the preceding vehicle may be used for this purpose. FIG. 11 is the flow diagram that shows the process for anticipating the future speed of the preceding vehicle. This is activated at a period Tc. In Step 1101, the preceding vehicle speed which was measured at the time of the last time activation is acquired. In Step 1102, the future speed Veo(t–T)of the preceding vehicle which was calculated at the time of the last time activation is acquired. In Step 1003, the presently measured preceding vehicle speed is acquired. In Step 1104, the comparison of the preceding vehicle future speed Vep(t–T) with the presently measured preceding vehicle speed is performed to evaluate the last time expectation. The evaluation is reflected to the assumption of the preceding vehicle future speed Vep(t–Tc) as the amount of correction δ. The amount of correction δ is calculated in accordance with the following Equation 3:

$$\delta = \frac{1}{2 \cdot T_c}(V_p(t) - V_{ep}(t - T_c)) \qquad \text{[Equation 3]}$$

In Step 1105, the preceding vehicle future speed Vep(t) is assumed by using the flowing Equation 4:

$$V_{ep}(t) = V_p + \frac{1}{T_c}(V_p(t) - V_p(t - T_c)) + \delta \qquad \text{[Equation 4]}$$

Using the assumed preceding vehicle future speed Vep(t), either the running target vehicle-to-vehicle distance or the stopping target vehicle-to-vehicle distance is selected. Thus, the control is made more quickly using the preceding vehicle future speed Vep(t) than the measured preceding vehicle speed, and therefore it is efficient at the time of the deceleration of the preceding vehicle especially. Also, at the time of the stopping of the preceding vehicle, it is possible to switch the target vehicle-to-vehicle distance more quickly. In accordance with this embodiment, by providing the running target vehicle-to-vehicle distance and the stopping target vehicle-to-vehicle distance, it is possible to cause the own vehicle to stop smoothly, with at the same vehicle-to-vehicle distance each time, and to improve the feeling to an occupant.

Next, the configuration of another embodiment (not shown) is explained. The embodiment is applicable to a vehicle comprising detection means for detecting the vehicle-to-vehicle distance between the own vehicle and the preceding vehicle, an internal combustion engine or a motor, a transmission shaft for transmitting the rotation of the internal combustion engine or the motor to a wheel, modification means mounted on the internal combustion engine or the motor, the transmission shaft, or the wheel for modifying its rotational speed, and control means receiving a signal from the detection means and outputting a control signal to the modification means for causing the own vehicle to follow the preceding vehicle. When the preceding vehicle is stopped, the own vehicle stops, restarts, and stops at the vehicle-to-vehicle distance behind the preceding vehicle. In this embodiment, since the own vehicle stops once, an occupant can recognizes the fact that the vehicle functions normally, and it is possible to increase the feeling of safety.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle running control device having:
    a first running mode in which a distance between an own vehicle and a preceding vehicle is controlled to a running target vehicle-to-vehicle distance; and
    a second running mode in which the distance between the own vehicle and the preceding vehicle is controlled to a stoppage target vehicle-to-vehicle distance;
    wherein said first running mode and said second running mode are switched on the basis of speed of the preceding vehicle.

2. The vehicle running controlling device according to claim 1, further comprising means for anticipating a future speed of the preceding vehicle based on present or past information.

3. The vehicle running controlling device according to claim 1, wherein said speed is a value within a range of from zero to 18 kilometers per hour.

4. The vehicle running controlling device according to claim 1, wherein after an accelerated speed of the controlled vehicle has been increased to a value greater than an accelerated speed of the controlled vehicle when speed of the preceding vehicle became substantially zero, stoppage is carried out.

5. A vehicle according to claim 1, wherein said target value is a value from 0.5 m to 5 m.

6. The vehicle running controlling device according to claim 1, wherein said target value is set when both of the speed of the preceding vehicle and the speed of the controlled vehicle are substantially zero.

7. The vehicle running controlling device according to claim 6, wherein, when the measured distance between the proceeding vehicle and the controlled vehicle is smaller than a preset minimum value in said first running mode, said measured distance is set as said target value.

8. The vehicle running controlling device according to claim 6, wherein, when the measured distance between the proceeding vehicle and the controlled vehicle is larger than a pre-stored minimum value in said first running mode, said minimum value is set as said target value.

9. A vehicle running controlling device according to claim 6, wherein said setting is input by the driver.

10. A vehicle running control device having:
    a first running mode in which a distance between an own vehicle and a preceding vehicle is controlled to a running target vehicle-to-vehicle distance; and
    a second running mode in which the distance between the own vehicle and the preceding vehicle is controlled to a stoppage target vehicle-to-vehicle distance;
    wherein, after detection that the speed of the preceding vehicle is substantially zero, said first running mode is switched to said second running mode.

11. In a vehicle comprising:
    an internal combustion engine or a motor;
    a transmission shaft for transmitting rotation of said internal combustion engine or said motor to a wheel;
    modification means installed in said internal combustion engine or motor, said transmission shaft or said wheel, for modifying rotational speed thereof;
    relative speed detection means for detecting the relative speed between the vehicle and a preceding vehicle;
    vehicle-to-vehicle distance detection means for detecting distance between the vehicle and said preceding vehicle; and
    control means receiving signals from said relative speed detection means and said vehicle-to-vehicle distance detection means, for outputting a control signal to said modification means;
    a vehicle running control device, wherein
        said control means has a first running mode in which the distance between the vehicle and said preceding vehicle is controlled to a running target vehicle-to-vehicle distance; and
        a second running mode in which the detected vehicle-to-vehicle distance is controlled to a stoppage target vehicle-to-vehicle distance; and
        said first running mode is switched to said second running mode on the basis of the speed of said preceding vehicle.

12. In a vehicle comprising:
    an internal combustion engine or a motor;
    a transmission shaft for transmitting rotation of said internal combustion engine or said motor to a wheel;
    modification means installed in said internal combustion engine or motor, said transmission shaft, or said wheel, for modifying rotational speed thereof;
    relative speed detection means for detecting relative speed between the vehicle and a preceding vehicle;
    vehicle-to-vehicle distance detection means for detecting distance between the vehicle and said preceding vehicle; and control means receiving signals from said relative speed detection means and said vehicle-to-vehicle distance detection means, for outputting a control signal to said modification means;

a vehicle running control device, wherein said control means has a first running mode in which the distance between the vehicle and said preceding vehicle is controlled to a running target vehicle-to-vehicle distance;

a second running mode in which the detected vehicle-to-vehicle distance is controlled to a stoppage target vehicle-to-vehicle distance; and after the detection that the speed of the preceding vehicle is substantially zero, said first running mode is switched to said second running mode.

13. In a vehicle comprising:

detection means for detecting distance between the vehicle and a preceding vehicle;

an internal combustion engine or a motor;

a transmission shaft for transmitting rotation of said internal combustion engine or motor to a wheel;

modification means installed in said internal combustion engine or motor, said transmission shaft or said wheel, for modifying rotational speed thereof; and control means receiving a signal from said detection means, for supplying a control signal to said modification means and causing the vehicle to run following said preceding vehicle;

a vehicle running control device, wherein when said preceding vehicle has stopped, accelerated speed of the vehicle is made larger than accelerated speed of the vehicle at the time when said preceding vehicle is stopped, and thereafter stoppage is carried out with a distance between the vehicles at the back with respect to said preceding vehicle.

14. A vehicle comprising:

detection means for detecting distance between the vehicle and a preceding vehicle;

an internal combustion engine or motor;

a transmission shaft for transmitting the rotation of said internal combustion engine or motor to a wheel;

modification means installed in said internal combustion engine or motor, said transmission shaft, or said wheel, for modifying rotational speed thereof; and control means receiving a signal from said detection means, for supplying a control signal to said modification means and causing the vehicle to run following said preceding vehicle;

wherein the vehicle continues running even after said preceding vehicle has stopped, and after the distance between said preceding vehicle and the vehicle has fallen below a target value, stoppage is carried out with a distance between the vehicles at the back with respect to said preceding vehicle.

15. A vehicle comprising:

detection means for detecting distance between the vehicle and a preceding vehicle;

an internal combustion engine or motor;

a transmission shaft for transmitting rotation of said internal combustion engine or motor to a wheel;

modification means installed in said internal combustion engine or motor, said transmission shaft or said wheel, for modifying rotational speed thereof; and control means receiving a signal from said detection means, for supplying a control signal to said modification means and causing the own vehicle to run following said preceding vehicle;

wherein even when said preceding vehicle has stopped, the vehicle also stops and thereafter restarts the running and stoppage is carried out with a distance between the vehicles at the back with respect to said preceding vehicle.

* * * * *